April 1, 1969　　　R. W. ZURCHER　　　3,436,729
MULTICOLORED ANTI-COLLISION BEACON FOR INDICATING POSITION
AND RELATIVE DIRECTION OF VEHICLE TRAVEL
Filed Dec. 14, 1965

INVENTOR.
RAYMOND W. ZURCHER
BY *Joseph F. Cole*
ATTORNEY

United States Patent Office 3,436,729
Patented Apr. 1, 1969

3,436,729
MULTICOLORED ANTI-COLLISION BEACON FOR INDICATING POSITION AND RELATIVE DIRECTION OF VEHICLE TRAVEL
Raymond W. Zurcher, San Mateo, Calif., assignor of thirty percent each to Dean E. Barnette and Richard T. Preston, San Mateo, Calif.
Filed Dec. 14, 1965, Ser. No. 513,785
Int. Cl. B60q 1/26, 1/46
U.S. Cl. 340—87                                    4 Claims

ABSTRACT OF THE DISCLOSURE

An anti-collision beacon mounted in fixed position on a vehicle and having a globe defining a red forward transparent section, a green aft transparent section, and opposite lateral transparent sections on the port and starboard sides contrasting in color with the forward and aft sections. A source of light is disposed in the globe, whereby beams of colored light corresponding with the colors of the transparent sections may be emitted through the latter so that the position and relative direction of travel of the vehicle may be determined by an observer in another vehicle or on the ground.

---

The present invention relates to improvements in an anti-collision beacon for vehicles. It consists of the combinations, constructions and arrangement of parts, as hereinafter described and claimed.

An object of my invention is to provide a beacon on a vehicle whereby the position and relative direction of travel of the vehicle can be determined by an observer in another vehicle or on the ground.

For instance, the present red rotating beacons in use on aircraft today are non-directional and only determine the position of an observed aircraft. In order to determine the relative direction of the sighted aircraft, the observer must then attempt to see the red, green and white navigational lights. As to such navigational lights, the red is located on the port wing, the green on the starboard wing, and the white on the tail. This arrangement, under normal conditions and circumstances, takes undue time and often is not possible because of distances and/or background in high density areas.

The navigational lighting system used today in aircraft was designed long ago for slow moving ships. Up to the present time, with the addition of the red rotating beacon, this system has been generally adequate. Moreover, with the increase in speed of aircraft, such as jets, and with further increases in speed contemplated in the future, a single powerful beacon to immediately determine the position and relative direction of a sighted aircraft to either the observer in another aircraft or on the ground controlling aircraft is imperative for maximum safety of all concerned.

The anti-collision beacon forming the subject matter of this invention been designed to overcome the shortcomings pointed out above in connection with the conventional lighting system now employed on aircraft.

Briefly stated, the beacon now proposed has a red forward transparent section that will emit a red beam when the aircraft on which the beacon is mounted is flying toward the observer in another aircraft or on the ground. Also, the beacon has a green aft transparent section for emitting a green beam, whereby the observer will immediately know that the sighted aircraft is flying away from the observer. Moreover, the beacon has a transparent section on each of the port and starboard sides that are constrasting in color with that of the forward and aft sections, for example, amber or blue, and thus the observer will be informed that the aircraft carrying the beacon is making a crossing course of flight. On occasions, both a red and an amber beam, for example, or a green and an amber beam, as a further example, will be visible to the observer, when the aircraft is making a crossing angular course of flight relative to the observer. Thus the latter will be able to determine not only the position of the sighted aircraft but also its relative direction.

Other objects and advantages will appear as the specification proceeds, and the novel features of the invention will be particularly pointed out in the appended claims.

For a better understanding of the invention, reference should be had to the accompanying drawings, forming part of this specification, in which.

Figure 1:
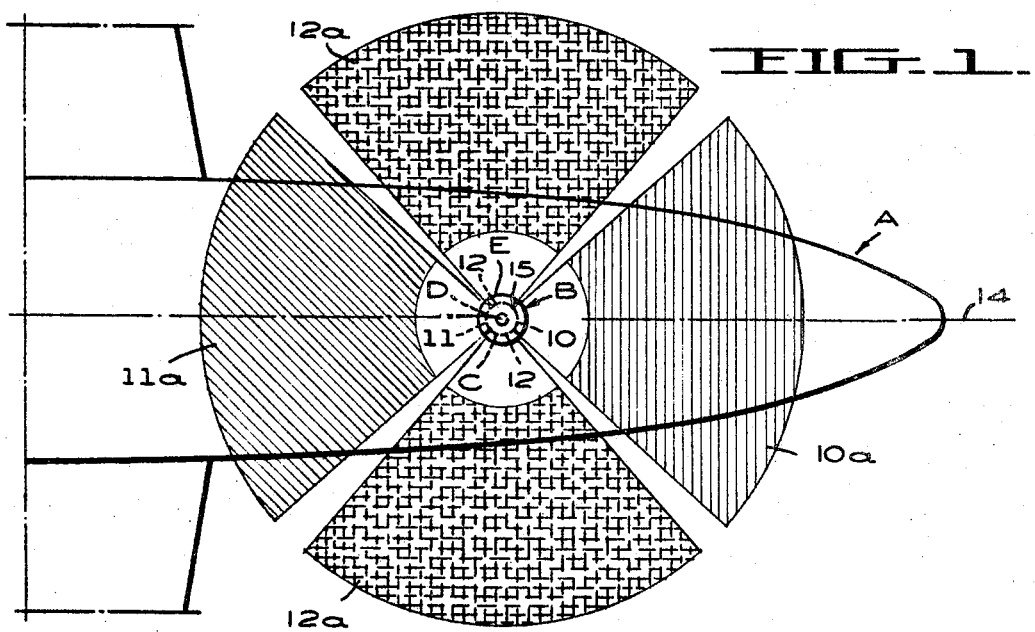
FIG. 1 is a fragmentary top plan view of an aircraft having my anti-collision beacon mounted thereon.

While I have shown only the preferred embodiments of the invention, it should be understood that various changes, or modifications, may be made within the scope of the appended claims without departing from the spirit thereof.

Detailed description

Referring now to the drawing in detail, an aircraft A has been illustrated as having my anti-collision beacons B mounted on the top and bottom thereof so as to be visible to an observer in another aircraft or on the ground. These beacons are identical with one another and a description of one will suffice for both. As the specification proceeds, it will be pointed out that the beacons may be used on other types of vehicles.

It will be noted that a globe C is provided for the beacon, and this globe defines a red forward transparent section 10, a green aft transparent section 11, and for the purpose of illustration only, the beacon further has opposite amber or yellow transparent sections 12 on the port and starboard sides. These sections may be made of plastic, plain or polarized glass, and may have a lens effect, if desired.

Figure 3:
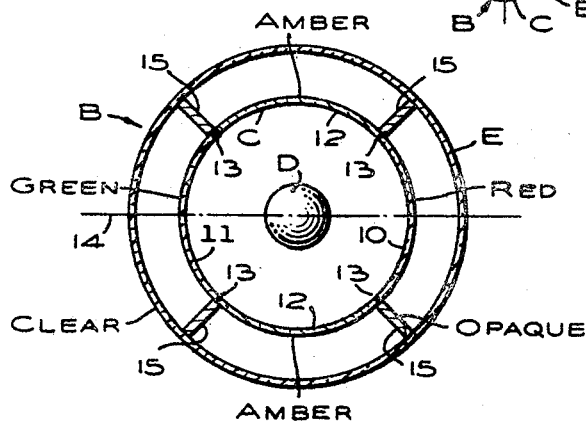
FIG. 3 is an enlarged horizontal sectional view taken along the plane 3—3 of FIG. 2, showing a stationary source of light disposed in the interior of the beacon globe.

Referring now to FIGS. 1 and 3, a source of light D is disposed in the interior of the globe, whereby beams of colored light may be emitted through the latter so that the position and relative direction of the aircraft A may be immediately determined by an observer in another aircraft or on the ground. In FIG. 1, the beam 10a has been hatched to indicate red, the beam 11a hatched to indicate green, and the beams 12a hatched to indicate amber or yellow. These beams will be visible for considerable distances.

As shown in FIG. 3, the source of light D is stationary, whereby all of the transparent sections will be illuminated simultaneously. The light source D may be steady, or flashing on and off, as desired.

With particular reference to FIG. 3, and for the purpose of illustration only, it will be observed that each of the transparent sections 10, 11 and 12 extend horizontally through substantially 90° of a circle, and the junctions 13 between adjacent transparent sections are disposed at substantially 45° relative to the longitudinal axis 14 of the aircraft A on which the globe C is mounted.

Moreover, opaque light-blocking vanes 15 extend laterally from the exterior of the globe C, and preferably in radial directions relative to the latter. As shown in FIG. 3, these vanes are disposed substantially in alignment with the junctures 13 between two adjacent transparent sections. Also, the vanes extend laterally from the globe a sufficient distance so that not more than two of the transparent sections may be seen by the observer in another aircraft or on the ground. For example, when the aircraft A is flying on a course crossing another aircraft, the observer in the latter may see both red and amber beams of light, or green and amber beams. On the other hand, if the aircraft A is flying toward the observer, the latter will see the red beam 10a only. Likewise, if the aircraft A is flying away from the observer, the latter will see the green beam 11a only.

In order to support the outer edges of the vanes 15 and improve the passage of the beacon B through the air, a clear transparent shield E has been provided so as to surround the globe C in spaced relation with the latter in an outward direction, as disclosed in FIG. 3. These vanes extend from the exterior of the globe C to the interior surface of the shield E.

Figure 2:
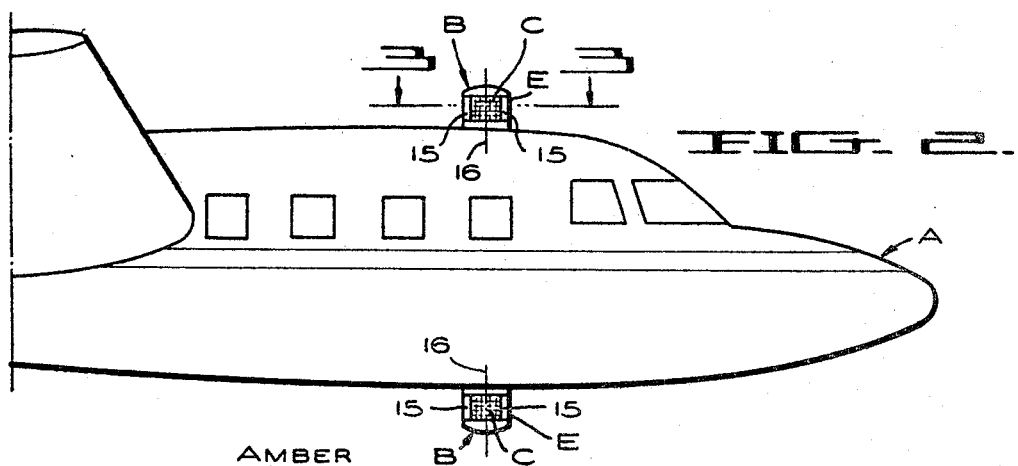
FIG. 2 is a side elevational view of FIG. 1.
Figure 4:
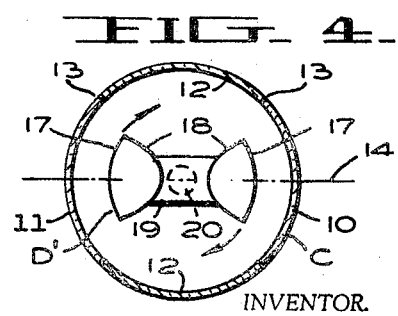
FIG. 4 is a horizontal sectional view taken through a modified embodiment of the invention, showing a rotating source of light.

Turning now to the modified embodiment of the invention, as shown in FIG. 4, the construction of the globe C is identical with that previously described in connection with FIGS. 1 to 3, inclusive; accordingly, like reference characters have been applied to corresponding parts. In FIG. 4, however, the source of light D' is rotatable about a substantially vertical axis 16 of the globe C (see FIG. 2), whereby the transparent sections will be illuminated in consecutive order.

By the way of illustration only, the source of light D' in FIG. 4 may be provided by a pair of oppositely facing bulbs 17, each having a mirror 18 for projecting beams of light that may be visible for a considerable distance. These bulbs may be mounted on a bracket 19 that is fixed to a motor-driven shaft 20 which will rotate the source of light D' about the axis of the shaft 20. Again, the light may be either steady or flashing.

It should be understood that the flashing nature of the light source employed could be accomplished by any of several means: rotating bulbs, rotating mirrors, condenser discharge bulbs, strobe lights, neon, or any combination of electrical forces suitable for giving flashing effect.

In lieu of using amber or yellow for the port and starboard transparent sections 12, other color or colors may be used, for example blue, but not limited thereto. In other words, the opposite lateral transparent sections 12 will be constrasting in color with the forward red and aft green transparent sections 10 and 11, respectively.

The term "vehicle" is broad enough to include aircraft, boats, ground vehicles and any other means for transportation where anti-collision is important.

I claim:
1. The combination with a vehicle having an anti-collision beacon mounted thereon in fixed position, the beacon comprising:
 (a) a globe mounted on the vehicle and defining a red forward transparent section, a green aft transparent section, and opposite lateral transparent sections on the port and starboard sides contrasting in color with the forward and aft sections;
 (b) and a source of light disposed in the interior of the globe, whereby beams of colored light corresponding with the colors of the transparent sections may be emitted through the latter so that the position and relative direction of travel of the vehicle may be determined visually by an observer in another vehicle or on the ground.

2. The combination of a vehicle and an anti-collision beacon, as set forth in claim 1;
 (c) and in which each transparent section extends horizontally through substantially 90° of a circle, and the junctures between adjacent transparent sections are disposed substantially at 45° relative to the longitudinal axis of the vehicle on which the globe is mounted.

3. The combination of a vehicle and an anti-collision beacon, as set forth in claim 1;
 (c) and in which opaque vanes extend laterally from the exterior of the globe, each vane being disposed substantially in alignment with the juncture between two adjacent transparent sections, and the vanes extending laterally from the globe to a sufficient distance so that no more than two of the transparent sections may be seen by the observer at one time.

4. The combination of a vehicle and an anti-collision beacon, as set forth in claim 3;
 (d) and in which a clear transparent shield surrounds the globe and is spaced outwardly therefrom, the vanes extending from the exterior of the globe to the interior surface of the shield.

References Cited

UNITED STATES PATENTS

| | | | |
|---|---|---|---|
| 2,341,862 | 2/1944 | Garland | 340—84 |
| 2,584,292 | 2/1952 | Rogers | 340—84 X |
| 2,938,192 | 5/1960 | Adler | 340—25 |

JOHN W. CALDWELL, *Primary Examiner.*

U.S. Cl. X.R.

340—25, 84